(12) United States Patent
Bacic (10) Patent No.: US 11,125,104 B2
(45) Date of Patent: Sep. 21, 2021

(54) HYBRID ELECTRIC AIRCRAFT PROPULSION SYSTEM

(71) Applicant: ROLLS-ROYCE plc, London (GB)

(72) Inventor: Marko Bacic, Oxford (GB)

(73) Assignee: ROLLS-ROYCE PLC, London (GB)

( * ) Notice: Subject to any disclaimer, the term of this patent is extended or adjusted under 35 U.S.C. 154(b) by 237 days.

(21) Appl. No.: 16/391,641

(22) Filed: Apr. 23, 2019

(65) Prior Publication Data
US 2019/0345837 A1    Nov. 14, 2019

(30) Foreign Application Priority Data
May 14, 2018 (GB) ........................ 1807771

(51) Int. Cl.
| | | |
|---|---|---|
| *F01D 15/10* | (2006.01) | |
| *F01D 11/24* | (2006.01) | |
| *F02C 9/42* | (2006.01) | |

(52) U.S. Cl.
CPC .............. *F01D 15/10* (2013.01); *F01D 11/24* (2013.01); *F02C 9/42* (2013.01); *F05D 2200/20* (2013.01); *F05D 2220/76* (2013.01); *F05D 2260/42* (2013.01); *F05D 2270/03* (2013.01);
(Continued)

(58) Field of Classification Search
CPC ...... F02C 9/26; F02C 9/42; F02C 9/44; F02C 9/48; F02C 9/50; F01D 11/24; F01D 15/10; B64D 2027/026; B64D 27/24; F05D 2200/20; F05D 2220/76; F05D 2260/42;
(Continued)

(56) References Cited

U.S. PATENT DOCUMENTS

| | | | | |
|---|---|---|---|---|
| 4,313,167 A | * | 1/1982 | Brown ...................... | F02C 9/28 60/223 |
| 7,853,392 B2 | * | 12/2010 | Healey ...................... | F02C 9/00 701/100 |

(Continued)

FOREIGN PATENT DOCUMENTS

| | | |
|---|---|---|
| EP | 3 421 367 A1 | 1/2019 |
| WO | 2018175349 | 9/2018 |

OTHER PUBLICATIONS

Great Britain search report dated Nov. 7, 2018, issued in GB Patent Application No. 1807771.9.
(Continued)

*Primary Examiner* — Jason H Duger
(74) *Attorney, Agent, or Firm* — Crowell & Moring LLP (57) ABSTRACT

The present disclosure concerns control a hybrid electric gas turbine system (300) for an aircraft. The system comprises an electric generator (308) and a gas turbine (309) to form a generator system, an electric motor (303) and a fan (302) to form a propulsor (301), a controller (306) and an electric storage unit (307). After receiving a command for a change in demand for thrust, the controller (306) determines an operational profile that minimises a function comprising a measure of fuel supplied to the gas turbine (309), a transfer of electric power from or to the electric storage unit (307) and a difference between measures of current and demanded thrust over a time period. The controller then operates the electric motor (303), gas turbine (309) and electric storage unit (307) according to the determined operational profile over the time period.

17 Claims, 6 Drawing Sheets

(52) U.S. Cl.
CPC .. *F05D 2270/051* (2013.01); *F05D 2270/061* (2013.01); *F05D 2270/07* (2013.01)

(58) Field of Classification Search
CPC ........... F05D 2270/03; F05D 2270/051; F05D 2270/061; F05D 2270/07
See application file for complete search history.

(56) References Cited

U.S. PATENT DOCUMENTS

| | | | | |
|---|---|---|---|---|
| 8,447,441 | B2* | 5/2013 | Calvignac | G06F 7/00 |
| | | | | 701/3 |
| 9,260,976 | B2* | 2/2016 | Phillips | G07C 5/004 |
| 9,586,690 | B2* | 3/2017 | Rajashekara | F01D 15/10 |
| 9,853,591 | B2* | 12/2017 | Saha | H02P 29/024 |
| 2005/0193739 | A1* | 9/2005 | Brunell | G05B 13/042 |
| | | | | 60/772 |
| 2010/0126178 | A1 | 5/2010 | Hyde et al. | |
| 2015/0013306 | A1 | 1/2015 | Shelley | |
| 2018/0002025 | A1 | 1/2018 | Lents et al. | |
| 2019/0002116 | A1* | 1/2019 | Gansler | B64D 27/24 |
| 2020/0290742 | A1* | 9/2020 | Kumar | B64D 27/24 |

OTHER PUBLICATIONS

Extended European Search Report, issued in EP Application No. 19169144.3, dated Oct. 4, 2019, pp. 1-7, European Patent Office, Munich, Germany.

* cited by examiner

HYBRID ELECTRIC AIRCRAFT PROPULSION SYSTEM

CROSS-REFERENCE TO RELATED APPLICATIONS

This application is based upon and claims the benefit of priority from British Patent Application No. GB 1807771.9, filed on 14 May 2018, the entire contents of which are incorporated by reference.

BACKGROUND

Technical Field

The present disclosure concerns control of a hybrid electric propulsion system for an aircraft.

Description of the Related Art Modern aircraft engines are commonly controlled by full authority digital engine control (FADEC) electronic engine controller (EEC) units, which host software configured to manage and control the engine. Conventional aircraft engines based on gas turbines contain one or more shafts, with typical civil aircraft having two or three shafts. Thrust is generated by mechanical coupling of the low pressure (LP) turbine to the fan.

In hybrid electric aircraft, thrust is generated by a fan that is driven by an electric motor instead of a gas turbine. Electric power is provided to the electric motor from a battery and/or a generator, which may be driven by a gas turbine. An advantage of hybrid electric propulsion is that the separate components of the fan and gas turbine engine can each be operated more efficiently, resulting in overall fuel savings. Integrating operation of the gas turbine engine with an electric propulsor can however result in problems arising from the difference between speed of control and response of an electric motor compared with a gas turbine. Whereas an electric motor can effectively respond immediately, a gas turbine engine will take longer to respond to a change in a control input, such as a variation in thrust demand. A hybrid electric aircraft must therefore be able to take into account such variations in behaviour.

SUMMARY

According to a first aspect there is provided a method of operating a hybrid electric gas turbine system comprising a generator system, a propulsor, a controller and an electric storage unit, the generator system comprising an electric generator arranged to drive a gas turbine having a plurality of rotor blades surrounded by a casing, the rotor blades separated from the casing by a clearance, the propulsor comprising a fan arranged to be driven by an electric motor, the controller being configured to operate the gas turbine and control a supply of electric power between the electric motor, the electric storage unit and the electric generator in response to a demand for thrust, the method comprising the controller:

receiving a command for a change in demand for thrust;

determining an operational profile that minimises a function comprising a measure of fuel supplied to the gas turbine, a transfer of electric power from or to the electric storage unit and a difference between measures of current and demanded thrust over a time period; and operating the electric motor, gas turbine and electric storage unit according to the determined operational profile over the time period.

By minimising the function, transient changes affecting operation of the gas turbine can be reduced, for example to reduce changes in tip clearances to maintain optimum efficiency of operation. Minimising the function can also have other advantages such as reducing the speed of thermal transients in the gas turbine.

The operational profile may be determined to maintain the clearance within a predetermined tolerance. The controller may for example control thermal growth of the casing by controlling a supply of cooling air to the casing, or may control the clearance more directly by mechanical movement of the casing relative to the rotor blade tips.

The operational profile may maintain a rate of change in speed of the gas turbine at or below a predetermined upper limit. The speed of the gas turbine may relate to a rotational speed of any one or more rotating components of the gas turbine, such as the fan, compressor or turbine components of the gas turbine, and in particular examples may relate to a rotational speed of a high pressure turbine of the gas turbine.

Where the change in demand for thrust is an increase in demand for thrust, the operational profile may comprise:

providing a first supply of electric power to the electric motor from the electric storage unit; and providing a second supply of electric power to the electric motor from the generator, wherein the first supply of electric power decreases as the second supply of electric power increases.

Where the change in demand for thrust is a decrease in demand for thrust, the operational profile may comprise:

transferring a first supply of electric power from the generator to the electric storage unit; and providing a second supply of electric power to the electric motor from the generator, wherein the first supply of electric power decreases as the second supply of electric power decreases.

The operational profile may comprise controlling the clearance between the rotor blade tips and the casing by controlling a supply of cooling air to the casing and/or controlling movement of the casing relative to the rotor blades.

The function may be of the form $$\min \int_0^{t_0} \left[ \begin{array}{c} \alpha^2 W_f(t)^2 + \beta^2 P_{bat}^2 + (\omega_d - \omega_{fan})^2 + \\ \int_0^{T_0} (\omega_d - \omega_{fan})^2 dt \end{array} \right] dt$$

where $\alpha$ and $\beta$ are constants, $\omega_d$ and $\omega_{fan}$ are commanded and actual fan rotational speeds, $P_{bat}$ is a power transferred to or from the electric storage unit (307), $W_f$ is the measure of fuel supplied to the gas turbine (309), the function being calculated over a time period from 0 to $t_0$.

The function may be discretised and calculated by the controller during operation. The function may be pre-calculated for a range of operational profiles, wherein the operational profile is determined by accessing a look-up table comprising a pre-calculated operational profile corresponding to the change in demand for thrust.

Minimising the function may be subject to constraints of the electric energy stored in the electric storage unit being at or above a minimum level, a rate of change of the fan speed being at or below a first maximum, the rate of change of the gas turbine speed being at or below a second maximum and the power transferred to or from the electric storage unit being at or below a maximum power transfer limit.

According to a second aspect there is provided a controller for a hybrid electric gas turbine system comprising a generator system, a propulsor, and an electric storage unit, the generator system comprising an electric generator arranged to drive a gas turbine having a plurality of turbine blades surrounded by a casing, the turbine blades separated from the casing by a clearance, the propulsor comprising a fan arranged to be driven by an electric motor, the controller being configured to operate the gas turbine and control a supply of electric power between the electric motor, the electric storage unit and the electric generator in response to a demand for thrust, the controller being configured to:

receive a command for a change in demand for thrust;

determine an operational profile that minimises a function comprising a measure of fuel supplied to the gas turbine, a transfer of electric power from or to the electric storage unit and a difference between measures of current and demanded thrust over a time period; and operate the electric motor, gas turbine and electric storage unit according to the determined operational profile over the time period.

According to a third aspect there is provided a non-transitory computer-readable medium having encoded thereon computer-readable instructions for a computer-implemented controller forming part of a hybrid electric gas turbine system further comprising a generator system, a propulsor, and an electric storage unit, the generator system comprising an electric generator arranged to be driven by a gas turbine having a plurality of rotor blades surrounded by a casing, the rotor blades separated from the casing by a clearance, the propulsor comprising a fan arranged to be driven by an electric motor, the controller being configured to operate the gas turbine and control a supply of electric power between the electric motor, the electric storage unit and the electric generator in response to a demand for thrust, wherein when executed by the controller, the computer-readable instructions cause the controller to perform a method comprising:

receiving a command for a change in demand for thrust;

determining an operational profile that minimises a function comprising a measure of fuel supplied to the gas turbine, a transfer of electric power from or to the electric storage unit and a difference between measures of current and demanded thrust over a time period; and operating the electric motor, gas turbine and electric storage unit according to the determined operational profile over the time period.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
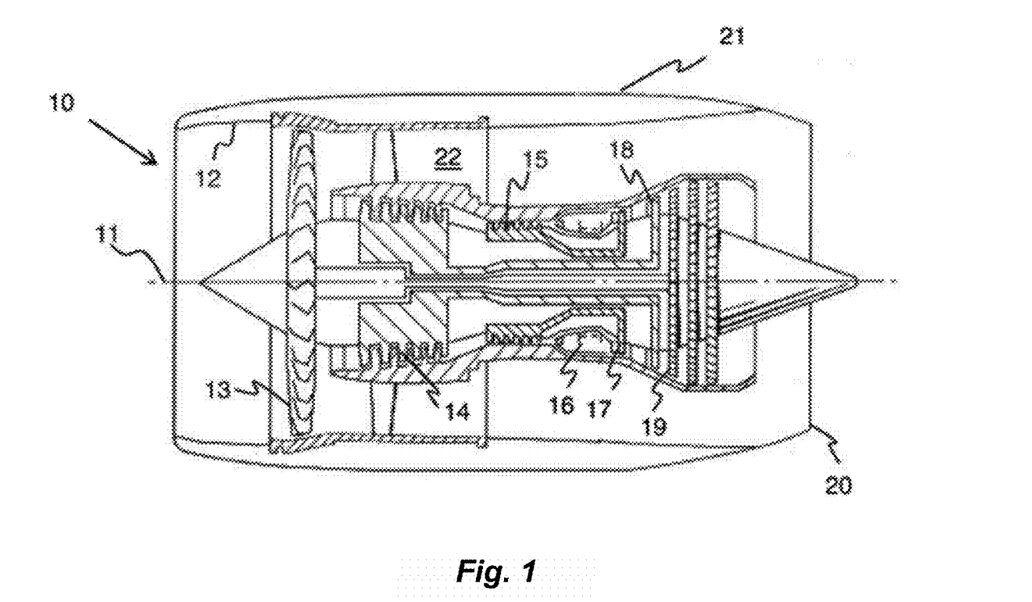
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, a combustor 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustor 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
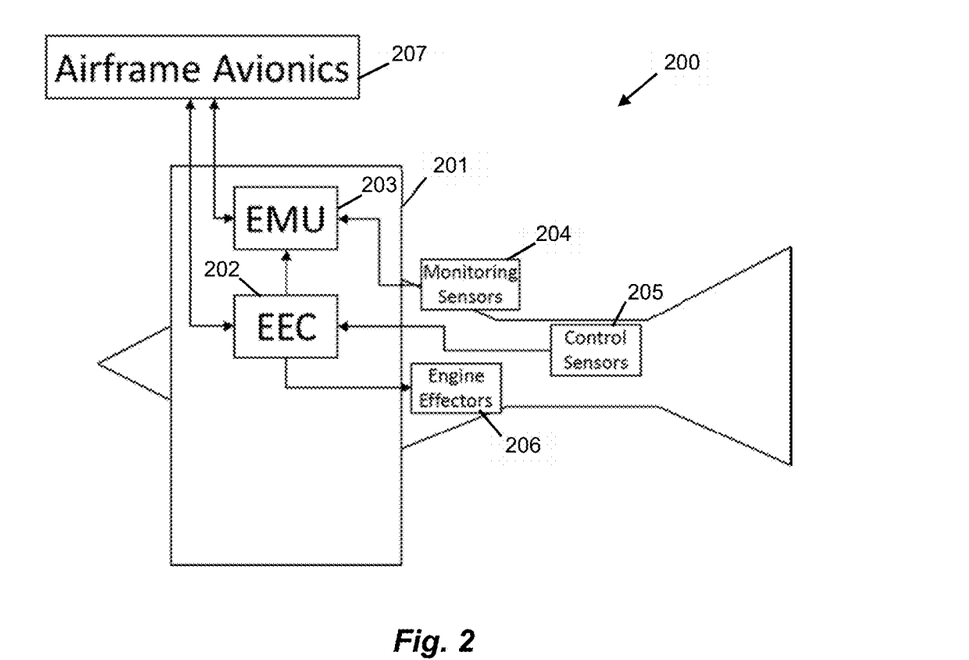
FIG. 2 is a schematic diagram of a control system arrangement for a turbofan engine.

FIG. 2 illustrates an example control and monitoring system 200 for a conventional civil turbofan engine 201. The engine 201 is controlled by an electronic engine controller (EEC) 202 and engine monitoring unit (EMU) 203, The EMU 203 takes inputs from monitoring sensors 204 and the EEC 202 from control sensors 205. The EEC controls operation of engine effectors 206 to control operation of the engine 201. The EMU 203 and EEC 202 are also connected to airframe avionics 207, having other controls, effectors and sensors for monitoring and control of other parts of the aircraft and for providing a demand for thrust to the engine 201.

In a control system for a hybrid electric aircraft propulsion system, three aspects of control need to be addressed.

Firstly, the hybrid electric power train needs to be controlled in a way that takes into account operability constraints of the gas turbine engine. Secondly, control of the aircraft flight control system, particularly relating to control of thrust, needs to be integrated with the hybrid electric power train. Thirdly, the flight management system needs to be integrated with the hybrid electric power train.

Figure 3:
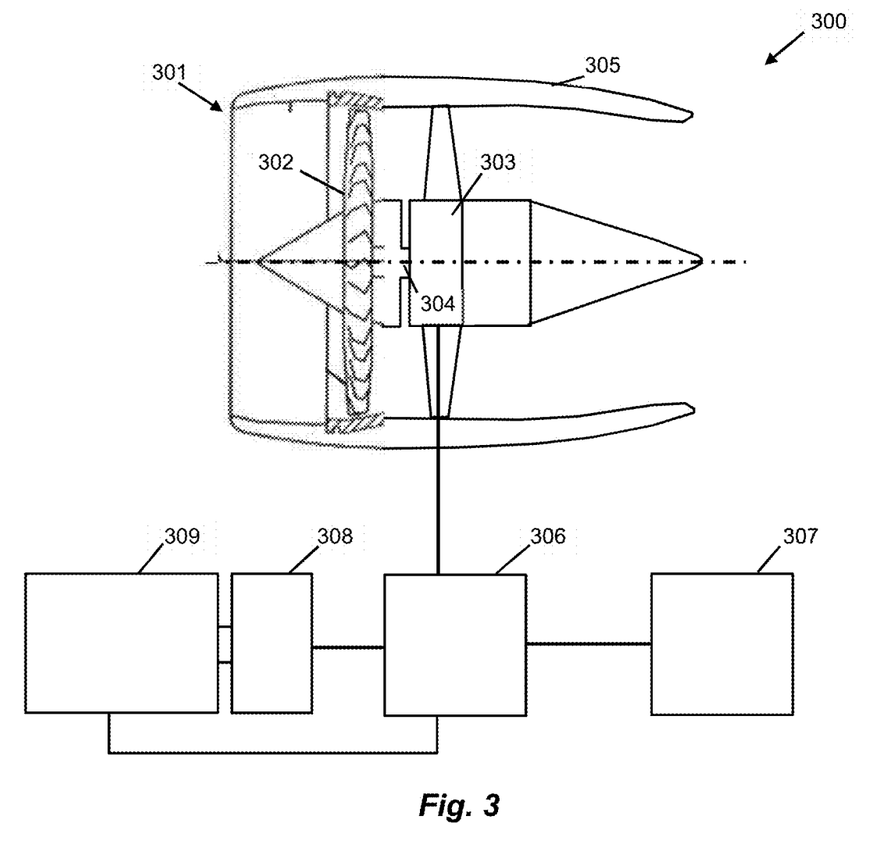
FIG. 3 is a schematic diagram of a hybrid electric propulsion system for an aircraft.

A schematic diagram of a basic hybrid electric aircraft propulsion system 300 is shown in FIG. 3. An electric propulsion unit, or engine, 301 comprises a fan 302 connected to an electric motor 303 by a central shaft 304. As with a conventional gas turbine engine, the engine 301 comprises a nacelle 305 surrounding the fan 302 and motor 303. The engine 303 is provided electric power via power electronics in a controller 306, which is connected to an electric storage unit 307, which may include a battery, a supercapacitor or a combination of the two.

The controller 306 is also connected to a generator 308 and a gas turbine engine 309. The gas turbine engine 309 drives the generator 308 to generate electric power, which the controller 306 distributes between the electric storage unit 307 and the electric motor 303. Under some conditions, the electric motor 303 may also act as a generator, for example when a reduction in thrust is demanded and the forward movement of the engine 301 drives the fan 302 until a required fan speed is reached. Energy may then be taken from the motor 303 and stored in the electric storage unit 307.

The controller 306 takes inputs from the aircraft control system (not shown), which provides a thrust or fan speed demand. The controller 306 then manages how the demand is achieved, by balancing use of the gas turbine engine 309 and generator 308 with the electric storage unit 307. For example, when a step increase in demand is received, the controller 306 may use the electric storage unit 307 to provide an immediate increase in electric power to the motor 303, while the gas turbine engine 309 is powered up more slowly to accommodate for the different behaviour of the gas turbine 309. Once the gas turbine engine 309 has reached a required power output level, the balance of power taken from the generator 308 and electric storage unit 307 can shifted so that all of the electric power comes from the generator 308, and an additional amount can be used to recharge the electric storage unit 307.

The ways in which the controller 306 can balance operation of the gas turbine engine 309 with the electric storage unit 307 depends on the particular characteristics of the gas turbine engine 309. Typical gas turbine dynamics can be simplified into set of two distinct groups that are relevant for fuel burn and a resulting cost of operation: shaft power dynamics and tip clearance dynamics. Shaft power dynamics relate to the relationship between fuel supplied and the resulting shaft speed. Time constants of the order of 1 to 10 seconds may be involved in this relationship, leading to working line excursions and operability-driven constraints. Tip clearance dynamics are short term changes in clearance between the high pressure (HP) blade tips and the surrounding casing. Changes in engine power level occurring at a rate of more than around 0.1 percent per second of the fan speed typically cannot be accurately tracked using current active tip clearance systems, which can result in either contact between the blade tips and the casing or a sub-optimum clearance between the tips and the casing. Increasing the tolerance between the blade tips and the casing can reduce this, but at the cost of significantly reduced efficiency. It would therefore be advantageous to be able to maintain tip clearance within a reduced tolerance while allowing for rapid changes in engine power.

Gas Turbine Engine Dynamics

Gas turbine engine dynamics can be in the first instance be modelled as $$\frac{dNH}{dt} = f(NH) + g(NH)Wf \qquad \text{[Equation 1]}$$

where NH is the turbine speed and Wf the fuel flow, f(NH) and g(NH) being functions of the turbine speed.

Low pressure (LP) turbine torque, $\tau_t$, may be defined as:

$$\tau_t = h(NL, NH, P0, P30) \qquad \text{[Equation 2]}$$

where NL is the fan speed, P0 the inlet pressure and P30 the HP exit pressure.

Tip clearance dynamics can be broken down in four time constants: segment growth, blade growth, casing growth and disc growth, all of which depend on the engine power level, with blade and disc growth also having centrifugal components proportional to the square of rotational speed. These dynamics are described in further detail in U.S. Pat. No. 9,546,564 to Lewis, the disclosure of which is hereby incorporated by reference herein.

As described in Lewis, when the engine is switched on it begins to heat up and the disc and blades begin to rotate, which causes all of the rotating components to grow radially. Due to the rotation of the blades and their relatively small mass the rotor blades tend to grow more quickly, and substantially instantaneously, by a small amount. The disc grows radially outwardly by a relatively large amount, for example three times as much as the rotor blades, and with a longer time constant of for example around 100 seconds. The casing, which is relatively massive and does not rotate, grows by a relatively large amount, for example around three times as much as the rotor blades, but with a long time constant of for example around 50 seconds.

A segment assembly may define an inner surface of the casing, being composed of a plurality of discontinuous segments in a circumferential array. The segment assembly may be actively or passively controlled to move radially inwardly or outwardly to change the clearance between the blade tips and the segment assembly. The segment assembly grows by a small amount, for example a third of the growth experienced by the rotor blades, but with a moderate time constant of for example around 15 seconds. On heating, the segment assembly grows radially inwards, whereas the casing and disc grow radially outwards and the rotor blades grow radially outwards. The clearance therefore reduces during rapid acceleration and deceleration phases. To reduce the change in clearance it is known to provide active or passive tip clearance control arrangements, for example by providing cooling air to the casing to reduce its diameter or retard its growth. The segment assembly may alternatively be moved mechanically to alter the clearance. A method of actively controlling tip clearance is described in Lewis that may be used in combination with the methods described herein to further reduce variations in tip clearance.

Electric Storage Dynamics

The electric storage unit has an energy state E that needs to be kept above a minimum energy state $E_{min}$, with energy depletion being dependent on the instantaneous power supplied by the battery, $P_d$, i.e.:

$$\frac{dE}{dt} = -P_d \quad \text{[Equation 3]}$$

Dynamics of Electrical Machines

Electrical machines have dynamics associated with their inertia and dynamics associated with the electrical circuit (including power electronics) to create the magnetic field. Electrical circuit and/or power electronics dynamics are several orders of magnitude faster than those encountered in gas turbines. Therefore, for the purposes of this analysis, both the electrical generator 308 and electric motor 303 can be considered as being simply inertial loads, with torque being proportional to the current regulated by power electronics, such that:

$$(J_m + J_{fan})\frac{d\omega_f}{dt} = k_m i_m \quad \text{[Equation 4]}$$

$$(J_t + J_g)\frac{d\omega_g}{dt} = \tau_t - k_g i_g \quad \text{[Equation 5]}$$

where $J_m$, $J_{fan}$, $J_t$, $J_g$ are, respectively, the inertias of the motor, fan, turbine (the LP turbine normally being attached to the generator), and generator, with $i_m$, $i_y$ being, respectively, the motor and generator currents (which are controlled by power electronics in the controller 306), and $\tau_t$ being a torque generated by the LP turbine.

Control During Fast Transients

During aircraft manoeuvring, approach, or implementing a step-climb there will be demand for a rapid change in thrust by the aircraft flight control system. This will be achieved by increasing current (and therefore power supply) to the electric motor 303 to supply increased power to the fan 302. The power can come from the electric storage unit 307 alone, or through spooling up the gas turbine 309 to drive the generator 308, or a combination of the two. Spooling up (or down) the gas turbine 309 will result in a working line excursion and excursions in tip clearance, both of which will affect the designed nominal steady state operating points. For example, spooling up a gas turbine generator from a cruise state to a maximum climb state within a short period of time, such as within a few seconds, will cause a temporary tip clearance excursion that means a steady state clearance will need to be designed to be larger than optimal to accommodate for this, which may cost around 0.1 to 1 percent in fuel efficiency due to the increased losses around the blade tips. The tip clearance excursion may be designed to be zero or negligibly small for a slower acceleration of a longer duration, for example 60 seconds instead of a few seconds, but such a delay would not be acceptable for a conventional turbofan gas turbine engine.

An alternative approach to achieve the same thrust acceleration requirement is to design a controller that delivers the required power, $P_{required}$, using both the electric storage unit 307 and the generator 308, such that $$P_{required} = P_{bat} + P_{gen} \quad \text{[Equation 6]}$$

where $P_{bat}$ is the power from the electric storage unit 307 and $P_{gen}$ is the power from the generator 308.

The required power is subject to various constraints such as those associated with usage of the energy storage unit 207, tip clearance constraints or working line constraints, which may be expressed as:

$$\frac{dNH}{dt} \leq X \quad \text{[Equation 7]}$$

$$E(t) \geq E_{min} \quad \text{[Equation 8]}$$

$$P_{bat} \leq P_{bat,max} \quad \text{[Equation 9]}$$

In other words, the rate of change in turbine speed (NH) needs to be less than or equal to an upper limit X, the energy remaining in the electric storage unit 307 needs to be greater than or equal to a minimum energy threshold $E_{min}$, and the power being drawn from the electric storage unit 307 needs to be less than or equal to a maximum power limit $P_{bat,max}$.

A simple strategy may consist of using up energy from the electric storage unit 307 at maximum power $P_{bat,max}$ until the remaining energy reaches $E_{min}$, followed by ramping up power from the gas turbine 309 via the generator 308. In this situation, upon acceleration being commanded, the tip clearances on the gas turbine will be opened up (by closing the tip clearance valves, reducing cooling supplied to the casing), allowing clearances to expand before the gas turbine 309 is spooled up. If the maximum power drawn from the electric storage unit 307 is not sufficient, one strategy may be to increase the power drawn from the gas turbine 309 at a rate to supplement the required power, in order to satisfy Equation 6.

Whilst the above are simple strategies that are likely to work on a single hybrid power train solution, they (a) may not be optimal; and (b) may be more difficult to implement in a multiple storage and/or distributed propulsion solution.

To achieve full optimality requires a model-based solution. There are many ways this can be achieved, such as optimal control via Pontrygin minimum principle, dynamic programming, among others, but one option is to use a predictive control framework so that fuel burn is minimised whilst satisfying those constraints. The advantage of using model predictive control (MPC) against an optimal control solution is the fact that the solution can be re-computed at every instant, taking account of plant feedback and the desired reference trajectory. The problem then becomes minimising the following function:

$$\min \int_0^{T_0} \left[ \alpha^2 W_f(t)^2 + \beta^2 P_{bat}^2 + (\omega_d - \omega_{fan})^2 + \int_0^{T_0}(\omega_d - \omega_{fan})^2 dt \right] dt \quad \text{[Equation 10]}$$

where $\alpha$ and $\beta$ are constants, $\omega_d$ and $\omega_{fan}$ are the commanded and actual fan rotational speeds, $P_{bat}$ is the power transferred to or from the electric storage unit, and $W_f$ is a measure of fuel supplied to the gas turbine. The measure of fuel may be a proxy for actual fuel supplied or may be an actual measurement of fuel being supplied to the gas turbine.

The function above is minimised subject to the following constraints:

$$E_{bat}(t_0) \geq E_{min} \quad \text{[Equation 11]}$$

$$\frac{dNH}{dt} \leq X \quad \text{[Equation 12]}$$

$$\frac{dNL}{dt} \leq Y \quad \text{[Equation 13]}$$

$$E(t) \geq E_{min} \quad \text{[Equation 14]}$$

$$P_{bat} \leq P_{bat,max} \quad \text{[Equation 15]}$$

together with the engine/generator/motor dynamics as described above. The rate of change for the turbine speed NH represents, among other things, a tip clearance change limit for the gas turbine.

Implementing the above solution on a computer requires the model to be discretised, such that the function then becomes:

$$\min \sum_{i=1}^{i=N-1} \begin{bmatrix} \alpha^2 W_f(k+i|k)^2 + \beta^2 P_{bat}^2(k+i|k) + \\ (\omega_d(k+i|k) - \omega_{fan}(k+i|k))^2 + \\ z(k+i|k)^2 \end{bmatrix} \quad \text{[Equation 16]}$$

subject to the following constraints:

$$E_{bat}(k+i|k) = E_{bat}(k+i-1|k) - P_{bat}(k+i-1|k)\Delta t \quad \text{[Equation 17]}$$

$$z(k+i|k) = z(k+i-1|k + \omega_d(k+i|k) - \omega_{fan}(k+i|k) \quad \text{[Equation 18]}$$

$$NH(k+i|k) - NH(k+i-1|k) \leq X \quad \text{[Equation 19]}$$

$$NL(k+i|k) - NL(k+i-1|k) \leq Y \quad \text{[Equation 20]}$$

$$E(k+N|k) \geq E_{min} \quad \text{[Equation 21]}$$

$$P_{bat}(k+i|k) \leq P_{bat,max} \quad \text{[Equation 22]}$$

$$\omega_f(k+i|k) = \frac{1}{J_{fan} + J_m} k_m i_m(k+i|)\Delta t + \omega_f(k+i-1|k) \quad \text{[Equation 23]}$$

$$\omega_g(k+i|k) = \frac{1}{J_g + J_t}(\tau_t - k_g i_g) + \omega_g(k+i-1|k) \quad \text{[Equation 24]}$$

$$NH(k+i|k) = NH(k+i-1|k) + (f(NH) + g(NH)W_f)\Delta t \quad \text{[Equation 25]}$$

$$\frac{P_{bat}}{V_{bat}} + i_g = i_m \quad \text{[Equation 26]}$$

The sum of Equation 16 is calculated over multiple time intervals from a first time interval i=1 to an (N−1)th interval where i=N−1.

In the above relationships, fan speed is used as a proxy parameter for thrust, since this is more easily measured directly. Other parameters may alternatively be used as a proxy for thrust, such as a pressure difference across the engine 301, pressure within the bypass duct of the engine 301 or a model-based estimate.

In the present embodiment, rates of change for NH and NL are used as proxies for clearance changes, giving computational and implementation advantages. Full tip clearance models as for example described in Lewis (see above) may alternatively be used.

The optimisation problem defined above is a non-linear programming problem, since the turbine speed behaviour is nonlinear, and may be solved by a variety of methods as will be appreciated by those skilled in the art. However computational complexity associated with non-linear problems may preclude execution at sufficient speed in a real-time environment because optimality and convergence cannot be guaranteed in a finite time. To reduce the computational complexity, the engine dynamics may alternatively be approximated as a set of piece-wise linear models around a series of turbine speed operating points. In operation, the controller 306 may obtain an optimised solution by inputting the start and end parameters into a look-up table, which returns operational parameters to enable the controller 306 to provide power to the electric motor 303 from the electric storage unit 307 and generator that has been previously calculated to minimise the above function.

In a general aspect, the controller 306 is configured to provide electric power to the electric motor 303 in response to a command for a change in thrust that balances power provided from the electric storage unit 307 and from the generator 308 driven by the gas turbine 309. Doing so may maintain a tip clearance between the blades and casing of the gas turbine within a predetermined tolerance. The tip clearance may for example be designed to be in the range of 0.1 to 1 millimetres, depending on the application and type of engine. Maintaining a lower tolerance around a nominal tip clearance allows the blades and casing to be designed with a smaller nominal clearance, thereby improving fuel efficiency.

Figure 4:
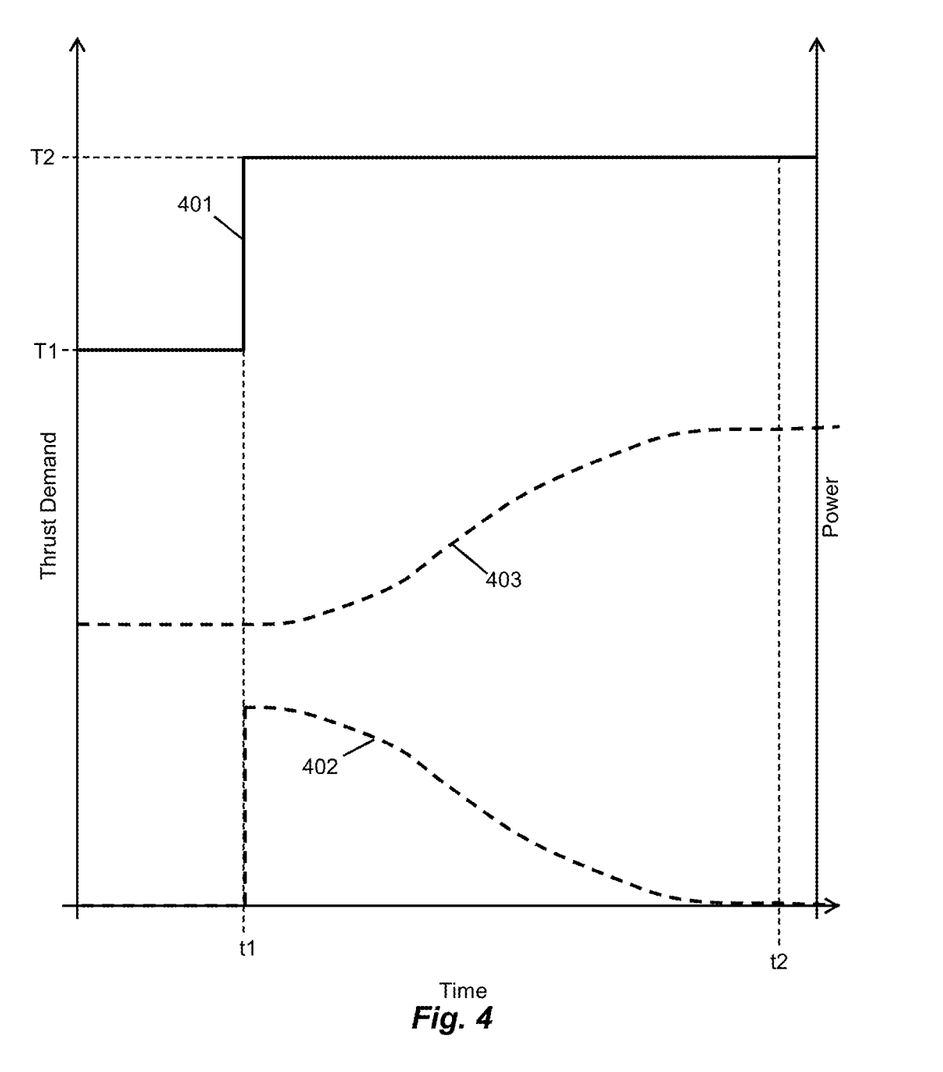
FIGS. 4 and 5 are schematic plots of thrust demand and power supplied by a generator and electric storage unit as a function of time.

An example of power as a function of time for an increase in thrust demand is illustrated schematically in FIG. 4. At a time $t_1$, an increase in thrust demand 401 from $T_1$ to $T_2$ is received by the controller 306, the thrust being currently met entirely by power from the generator 308. The controller 306 then determines an optimum balance between power obtained from the electric storage unit 307 and generator 308, either by minimising the function provided above or by inputting the requirements into a look-up table of pre-calculated functions. The power 402 supplied by the electric storage unit 307 is then immediately ramped up to initially fulfil the increase in thrust demand, while the power 403 supplied by the generator increases more slowly due to the constraint on the change in speed for the gas turbine. As the power drawn from the generator 308 increases, the power drawn from the electric storage unit 307 decreases, until at time t2 all of the power is again being provided by the generator 308. An additional amount of power may then be drawn from the generator to recharge the electric storage unit 307.

Figure 5:
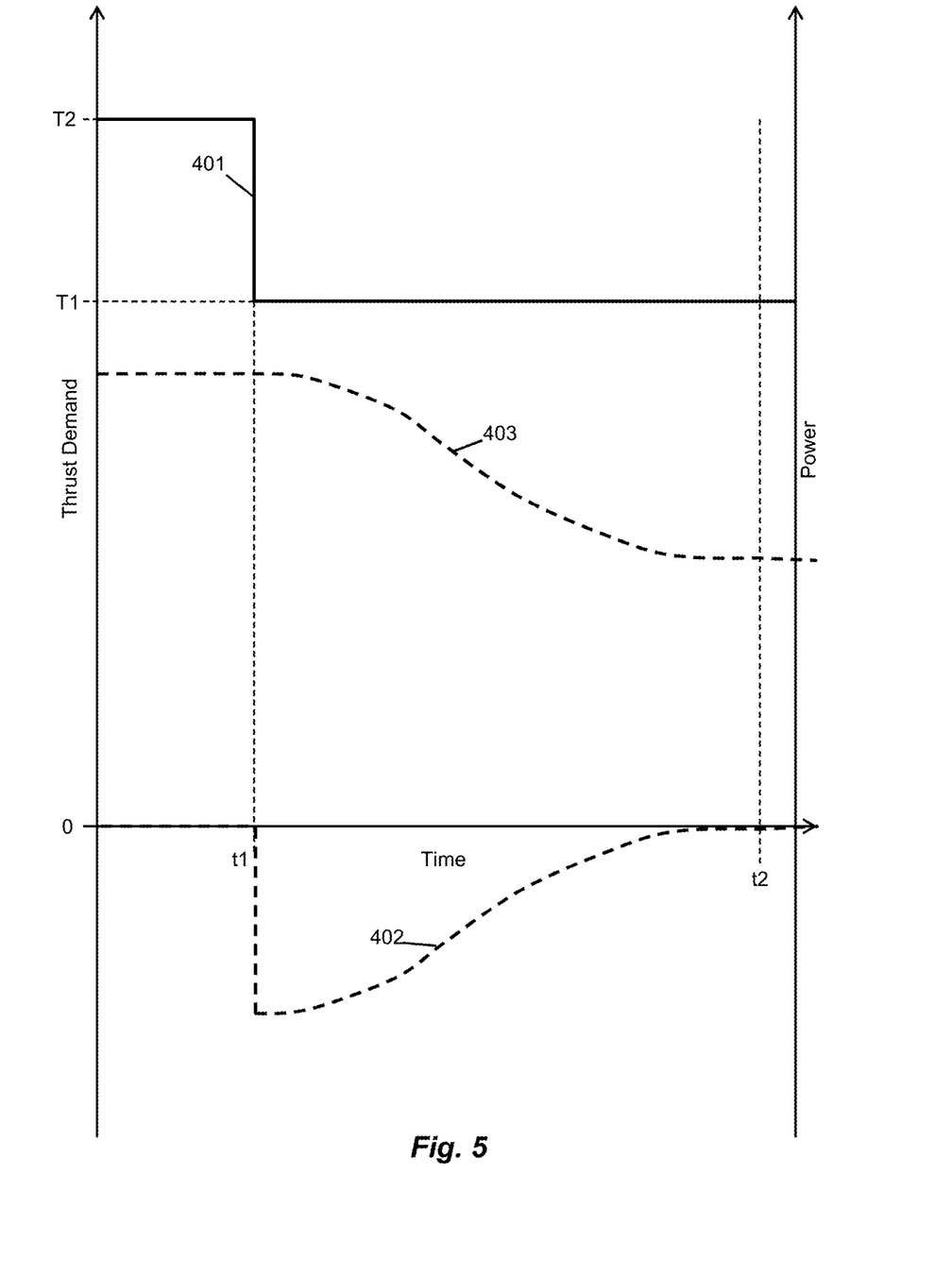

A reverse situation is outlined in FIG. 5, in which a decrease in thrust demand, from $T_2$ to $T_1$, is provided and the controller determines an optimum balance between power 403 from the generator 308 and power 402 transferred to the electric storage device unit 307. In this case, the electric storage unit 307 draws power, and this power drawn is gradually decreased to zero while the power provided from the generator is gradually reduced.

Figure 6:
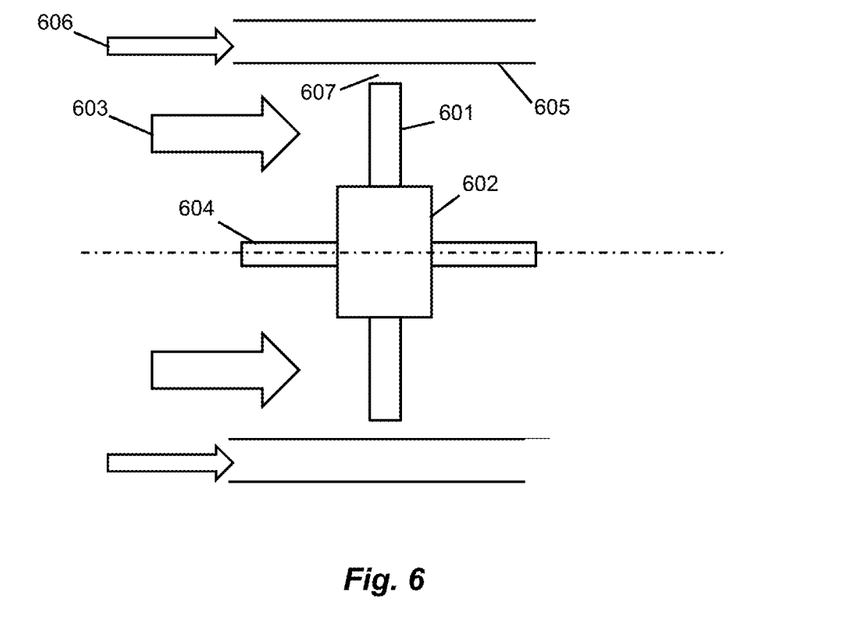
FIG. 6 is a schematic diagram of a high pressure zone within a gas turbine.

FIG. 6 illustrates schematically a high pressure (HP) zone of the gas turbine, in which a plurality of blades 601 are mounted to a rotating disk 602. An incoming hot gas stream 603 drives the blades 601 and disk 602, which then drive the gas turbine 309 and generator 308 via a central shaft 604. A casing 605 surrounds the blades 601 and disk 602, which is provided with an air cooling stream 606. Control of the air cooling stream through one or move valves (not shown) allows for control of the temperature of the casing, and therefore a degree of control over a clearance 607 between the blade tips and the internal surface of the casing 605.

Figure 7:
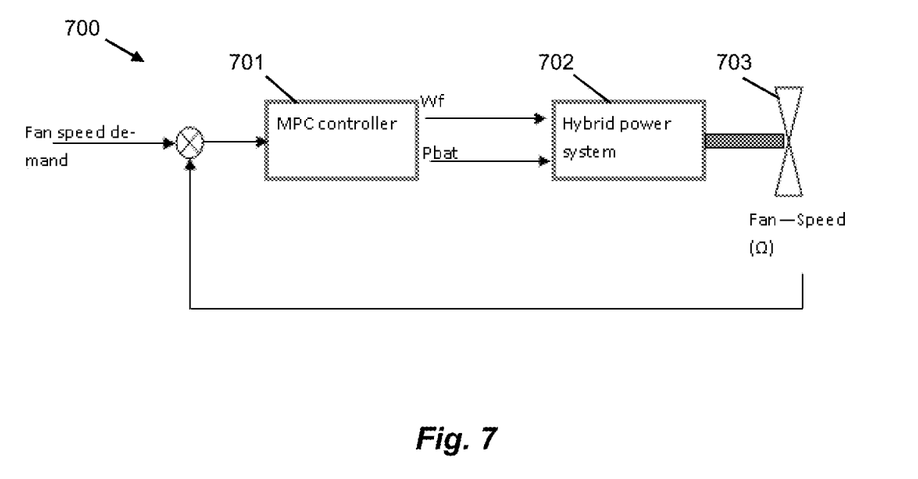
FIG. 7 is a schematic diagram of a control system for controlling a hybrid power system.

FIG. 7 illustrates an example control system 700 for implementing the optimisation method described herein. A fan speed demand, together with a current value of fan speed, is input to a model predictive controller 701, which determines an optimised operational profile to achieve the required demand. The controller 701 provides control outputs that control a measure of fuel flow $W_f$ and a power drawn to or from the battery $P_{bat}$ to the hybrid power system 702 (i.e. the system comprising the generator 308, gas turbine 309 and electric storage unit 307 of FIG. 3), which drives the fan 703.

Figure 8:
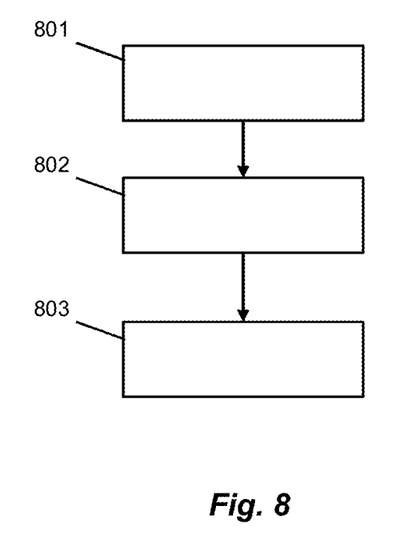
FIG. 8 is a schematic flow diagram of a method of operating a hybrid power system.

FIG. 8 is a schematic flow diagram illustrating an example method of operating a hybrid power system in accordance with the present disclosure. In a first step 801, a demand for a change in thrust is received by the controller. The controller then (step 802) determines an operational profile that minimises a function comprising a supply of fuel to the gas turbine, a transfer of electric power from or to the electric storage unit and a difference between measures of current and demanded thrust over a time period. The controller then (step 803) operates the electric motor, gas turbine and electric storage unit according to the determined operational profile over the time period.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A method of operating a hybrid electric gas turbine system comprising a generator system, a propulsor, a gas turbine, a controller and an electric storage unit,
   the generator system comprising an electric generator arranged to be driven by the gas turbine, the gas turbine having a plurality of rotor blades surrounded by a casing, the rotor blades separated from the casing by a clearance,
   the propulsor comprising a fan arranged to be driven by an electric motor, the controller being configured to operate the gas turbine and configured to control a supply of electric power between the electric motor, the electric storage unit and the electric generator in response to a demand for thrust, the method comprising the controller:
   receiving a command for a change in demand for thrust;
   determining an operational profile of the hybrid electric gas turbine system, wherein the determined operational profile minimises a function comprising a measure of fuel supplied to the gas turbine, a transfer of electric power from or to the electric storage unit and a difference between measures of current and demanded thrust over a time period extending from 0 to $t_0$; and
   operating the electric motor, the gas turbine and the electric storage unit according to the determined operational profile over the time period,
   wherein the function is of the form $$\min \int_0^{t_0} \left[ \alpha^2 W_f(t)^2 + \beta^2 P_{bat}^2 + (\omega_d - \omega_{fan})^2 + \int_0^{t_0} (\omega_d - \omega_{fan})^2 dt \right] dt \text{ s.t.}$$

where $\alpha$ and $\beta$ are constants,
$\omega_d$ is commanded rotational speed of the fan,
$\omega_{fan}$ is current rotational speed of the fan,
$(\omega_d - \omega_{fan})$ forms the difference between measures of current and demanded thrust,
$P_{bat}$ is power of the transfer of electric power from or to the electric storage unit, $W_f$ is the measure of fuel supplied to the gas turbine, and
wherein the function is minimised over the time period from 0 to $t_0$ and subject to constraints.

2. The method of claim 1, wherein the determined operational profile maintains the clearance within a predetermined tolerance.

3. The method of claim 1, wherein the determined operational profile maintains a rate of change in speed of the gas turbine at or below a predetermined upper limit.

4. The method of claim 1, wherein the change in demand for thrust is an increase in demand for thrust, the determined operational profile comprising: providing a first supply of electric power to the electric motor from the electric storage unit; and providing a second supply of electric power to the electric motor from the generator, wherein the first supply of electric power decreases as the second supply of electric power increases.

5. The method of claim 1, wherein the change in demand for thrust is a decrease in demand for thrust, the determined operational profile comprising: transferring a first supply of electric power to the electric storage unit; and providing a second supply of electric power to the electric motor from the generator, wherein the first supply of electric power to the electric storage unit decreases as the second supply of electric power decreases.

6. The method of claim 4, wherein the determined operational profile comprises controlling the clearance between the rotor blades and the casing by controlling a supply of cooling air to the casing and/or controlling movement of the casing relative to the rotor blades.

7. The method of claim 1, wherein the constraints include one or more of: electric energy stored in the electric storage unit being at or above a minimum level, a rate of change of a speed of the hybrid electric gas turbine system being at or below a limit, and the power of the transfer of electric power from or to the electric storage unit being at or below a limit.

8. A controller configured to control operation of a hybrid electric gas turbine system, the hybrid electric gas turbine system comprising a generator system, a propulsor, a gas turbine, and an electric storage unit,
   the generator system comprising an electric generator arranged to be driven by the gas turbine, the gas turbine having a plurality of turbine blades surrounded by a casing, the turbine blades separated from the casing by a clearance, and
   the propulsor comprising a fan arranged to be driven by an electric motor;
   the controller being configured to operate the gas turbine and configured to control a supply of electric power between the electric motor, the electric storage unit and the electric generator in response to a demand for thrust, the controller being further configured to:
   receive a command for a change in demand for thrust;
   determine an operational profile of the hybrid electric gas turbine system, wherein the determined operational profile minimises a function comprising a measure of fuel supplied to the gas turbine, a transfer of electric power from or to the electric storage unit and a difference between measures of current and demanded thrust over a time period extending from 0 to $t_0$; and
   operate the electric motor, the gas turbine and the electric storage unit according to the determined operational profile over the time period, wherein the function is of the form $$\min \int_0^{t_0} \left[ \alpha^2 W_f(t)^2 + \beta^2 P_{bat}^2 + (\omega_d - \omega_{fan})^2 + \int_0^{t_0} (\omega_d - \omega_{fan})^2 dt \right] dt \text{ s.t.}$$

where $\alpha$ and $\beta$ are constants,
$\omega_d$ is commanded rotational speed of the fan,
$\omega_{fan}$ is current rotational speed of the fan,
$(\omega_d - \omega_{fan})$ forms the difference between measures of current and demanded thrust,
$P_{bat}$ is power of the transfer of electric power from or to the electric storage unit,
$W_f$ is the measure of fuel supplied to the gas turbine, and
wherein the function is minimised over the time period from 0 to $t_0$ and subject to constraints.

9. The controller of claim 8, wherein the determined operational profile is determined to maintain the clearance within a predetermined tolerance.

10. The controller of claim 8, wherein the determined operational profile is determined to maintain a rate of change in speed of the gas turbine at or below a predetermined upper limit.

11. The controller of claim 8, wherein the change in demand for thrust is an increase in demand for thrust, the determined operational profile comprises instructions for the controller to: provide a first supply of electric power to the electric motor from the electric storage unit; and provide a second supply of electric power to the electric motor from the generator, wherein the first supply of electric power decreases as the second supply of electric power increases.

12. The controller of claim 8, wherein the change in demand for thrust is a decrease in demand for thrust, the determined operational profile comprises instructions for the controller to: transfer a first supply of electric power from the generator to the electric storage unit; and provide a second supply of electric power to the electric motor from the generator, wherein the first supply of electric power decreases as the second supply of electric power decreases.

13. The controller of claim 11, wherein the determined operational profile comprises instructions for the controller to control the clearance between the rotor blades and the casing by controlling a supply of cooling air to the casing and/or controlling movement of the casing relative to the rotor blades.

14. The controller of claim 8, wherein the constraints include one or more of: electric energy stored in the electric storage unit being at or above a minimum level, a rate of change of a speed of the hybrid electric gas turbine system being at or below a limit, and the power of the transfer of electric from or to the electric storage unit being at or below a limit.

15. A non-transitory computer-readable medium having encoded thereon computer-readable instructions configured to be executed by a computer-implemented controller forming part of a hybrid electric gas turbine system, the hybrid electric gas turbine system further comprising a generator system, a propulsor, a gas turbine, and an electric storage unit, the generator system comprising an electric generator arranged to be driven by the gas turbine, the gas turbine having a plurality of rotor blades surrounded by a casing, the rotor blades separated from the casing by a clearance, the propulsor comprising a fan arranged to be driven by an electric motor, the controller being configured to operate the gas turbine and configured to control a supply of electric power between the electric motor, the electric storage unit and the electric generator in response to a demand for thrust, wherein when executed by the controller, the computer-readable instructions are configured to cause the controller to:

receive a command for a change in demand for thrust;

determine an operational profile of the hybrid electric gas turbine system, wherein the determined operational profile minimises a function comprising a measure of fuel supplied to the gas turbine, a transfer of electric power from or to the electric storage unit and a difference between measures of current and demanded thrust over a time period extending from 0 to $t_0$; and operate the electric motor, the gas turbine and the electric storage unit according to the determined operational profile over the time period;

wherein the function is of the form $$\min \int_0^{t_0} \left[ \alpha^2 W_f(t)^2 + \beta^2 P_{bat}^2 + (\omega_d - \omega_{fan})^2 + \int_0^{t_0} (\omega_d - \omega_{fan})^2 dt \right] dt$$

where $\alpha$ and $\beta$ are constants,
$\omega_d$ is commanded rotational speed of the fan,
$\omega_{fan}$ is current rotational speed of the fan,
$(\omega_d - \omega_{fan})$ forms the difference between measures of current and demanded thrust,
$P_{bat}$ is power of the transfer of electric power from or to the electric storage unit,
$W_f$ is the measure of fuel supplied to the gas turbine, and
wherein the function is minimised over the time period from 0 to $t_0$ and subject to constraints.

16. The non-transitory computer-readable medium of claim 15, wherein the determined operational profile maintains the clearance within a predetermined tolerance.

17. The non-transitory computer-readable medium of claim 15, wherein the determined operational profile maintains a rate of change in speed of the gas turbine at or below a predetermined upper limit.

* * * * *